United States Patent
Broda et al.

(10) Patent No.: US 9,436,579 B2
(45) Date of Patent: Sep. 6, 2016

(54) REAL-TIME, MULTI-TIER LOAD TEST RESULTS AGGREGATION

(75) Inventors: Tal Broda, Sunnyvale, CA (US); Michael Hemmert, Scotts Valley, CA (US); Matthew Solnit, San Jose, CA (US)

(73) Assignee: SOASTA, Inc., Mountain View, CA (US)

( * ) Notice: Subject to any disclaimer, the term of this patent is extended or adjusted under 35 U.S.C. 154(b) by 299 days.

(21) Appl. No.: 12/804,338

(22) Filed: Jul. 19, 2010

(65) Prior Publication Data

US 2012/0017156 A1    Jan. 19, 2012

(51) Int. Cl.
*G06F 11/34* (2006.01)

(52) U.S. Cl.
CPC ....... *G06F 11/3495* (2013.01); *G06F 11/3409* (2013.01); *G06F 11/3414* (2013.01); *G06F 11/3419* (2013.01); *G06F 2201/875* (2013.01)

(58) Field of Classification Search
CPC ..... H04L 41/22; H04L 43/045; H04L 41/12; H04L 12/2602; H04L 43/00; G06F 11/3419; G06F 11/3414; G06F 11/3495
USPC ........................................................ 715/736
See application file for complete search history.

(56) References Cited

U.S. PATENT DOCUMENTS

| | | | |
|---|---|---|---|
| 5,414,809 A | 5/1995 | Hogan et al. | |
| 5,724,525 A | 3/1998 | Beyers et al. | |
| 5,945,986 A | 8/1999 | Bargar et al. | |
| 6,025,853 A | 2/2000 | Baldwin | |
| 6,092,043 A | 7/2000 | Squires et al. | |
| 6,134,582 A | 10/2000 | Kennedy | |
| 6,317,786 B1 | 11/2001 | Yamane et al. | |
| 6,434,513 B1 | 8/2002 | Sherman et al. | |
| 6,477,483 B1 | 11/2002 | Scarlat et al. | |
| 6,542,163 B2 | 4/2003 | Gorbet et al. | |
| 6,560,564 B2 | 5/2003 | Scarlat et al. | |
| 6,563,523 B1 | 5/2003 | Suchocki et al. | |
| 6,601,020 B1 | 7/2003 | Myers | |
| 6,738,933 B2 | 5/2004 | Fraenkel et al. | |
| 6,792,393 B1 | 9/2004 | Farel et al. | |
| 6,817,010 B2 | 11/2004 | Aizenbud-Reshef et al. | |
| 6,898,556 B2 | 5/2005 | Smocha et al. | |

(Continued)

OTHER PUBLICATIONS

Chester, Thomas et al., Mastering Excel 97, 1994, Sybex, 4th Ed., pp. 1016, 136-137, 430, 911, 957-958.*

(Continued)

*Primary Examiner* — Li Sun
(74) *Attorney, Agent, or Firm* — The Law Offices of Bradley J. Bereznak

(57) ABSTRACT

A method for real-time analysis of results from a load test performed on a target website includes periodically computing first-level aggregated test results within each of a plurality of load server instances that generate a load on the target website. The first-level aggregated test results are computed from data received by each of the load server instances from the target website every first time interval. The first-level aggregated test results are then periodically sent from each of the load server instances to an associated one of a plurality of analytic server instances every second time interval. The first-level aggregated test results are aggregated by each of the analytic server instances to produce second-level aggregated test results, which test results may then further aggregated to produce third-level aggregated test results at a data storage instance in real-time.

14 Claims, 5 Drawing Sheets

(56) References Cited

U.S. PATENT DOCUMENTS

| | | |
|---|---|---|
| 6,959,013 B1 | 10/2005 | Muller et al. |
| 6,975,963 B2 | 12/2005 | Hamilton et al. |
| 7,050,056 B2 | 5/2006 | Meyringer |
| 7,133,805 B1 | 11/2006 | Dankenbring et al. |
| 7,216,168 B2* | 5/2007 | Merriam ............... 709/224 |
| 7,334,162 B1* | 2/2008 | Vakrat et al. ............ 714/38.1 |
| 7,376,902 B2 | 5/2008 | Lueckhoff |
| 7,464,121 B2 | 12/2008 | Barcia et al. |
| 7,478,035 B1 | 1/2009 | Wrench et al. |
| 7,548,875 B2 | 6/2009 | Mikkelsen et al. |
| 7,587,638 B2* | 9/2009 | Shah et al. ............... 714/47.3 |
| 7,594,238 B2 | 9/2009 | Takahashi |
| 7,607,169 B1 | 10/2009 | Njemanze et al. |
| 7,617,201 B1 | 11/2009 | Bedell et al. |
| 7,630,862 B2* | 12/2009 | Glas et al. ............... 702/186 |
| 7,685,234 B2 | 3/2010 | Gottfried |
| 7,689,455 B2 | 3/2010 | Fligler et al. |
| 7,693,947 B2 | 4/2010 | Judge et al. |
| 7,725,812 B1 | 5/2010 | Balkus et al. |
| 7,743,128 B2* | 6/2010 | Mullarkey ............... 709/223 |
| 7,757,175 B2* | 7/2010 | Miller ............... 715/738 |
| 7,844,036 B2 | 11/2010 | Gardner et al. |
| 8,015,327 B1 | 9/2011 | Zahavi et al. |
| 8,166,458 B2 | 4/2012 | Li et al. |
| 8,291,079 B1* | 10/2012 | Colton et al. ............ 709/226 |
| 8,306,195 B2 | 11/2012 | Gardner et al. |
| 8,448,148 B1 | 5/2013 | Kolawa et al. |
| 8,464,224 B2* | 6/2013 | Dulip et al. ............ 717/128 |
| 8,479,122 B2 | 7/2013 | Hotelling et al. |
| 8,510,600 B2 | 8/2013 | Gardner et al. |
| 8,583,777 B1 | 11/2013 | Boyle et al. |
| 9,021,362 B2 | 4/2015 | Broda et al. |
| 2002/0138226 A1* | 9/2002 | Doane ............... 702/119 |
| 2002/0147937 A1 | 10/2002 | Wolf |
| 2003/0074161 A1 | 4/2003 | Smocha et al. |
| 2003/0074606 A1* | 4/2003 | Boker ............... 714/42 |
| 2003/0109951 A1 | 6/2003 | Hsiung et al. |
| 2003/0195960 A1 | 10/2003 | Merriam |
| 2004/0010584 A1* | 1/2004 | Peterson et al. ............ 709/224 |
| 2004/0039550 A1 | 2/2004 | Myers |
| 2004/0059544 A1 | 3/2004 | Smocha et al. |
| 2004/0064293 A1 | 4/2004 | Hamilton et al. |
| 2004/0119713 A1 | 6/2004 | Meyringer |
| 2004/0205724 A1 | 10/2004 | Mayberry |
| 2005/0102318 A1 | 5/2005 | Odhner et al. |
| 2005/0182589 A1* | 8/2005 | Smocha et al. ............ 702/121 |
| 2005/0216234 A1 | 9/2005 | Glas et al. |
| 2005/0278458 A1 | 12/2005 | Berger et al. |
| 2006/0031209 A1 | 2/2006 | Ahlberg et al. |
| 2006/0075094 A1 | 4/2006 | Wen et al. |
| 2006/0229931 A1 | 10/2006 | Fligler et al. |
| 2006/0271700 A1 | 11/2006 | Kawai et al. |
| 2007/0143306 A1 | 6/2007 | Yang |
| 2007/0232237 A1 | 10/2007 | Croak et al. |
| 2007/0282567 A1* | 12/2007 | Dawson et al. ............ 702/186 |
| 2007/0283282 A1 | 12/2007 | Bonfiglio et al. |
| 2008/0059947 A1* | 3/2008 | Anand et al. ............ 717/107 |
| 2008/0066009 A1 | 3/2008 | Gardner et al. |
| 2008/0140347 A1 | 6/2008 | Ramsey et al. |
| 2008/0147462 A1 | 6/2008 | Muller |
| 2008/0189408 A1 | 8/2008 | Cancel et al. |
| 2009/0077107 A1 | 3/2009 | Scumniotales et al. |
| 2009/0271152 A1 | 10/2009 | Barrett |
| 2009/0300423 A1 | 12/2009 | Ferris |
| 2010/0023867 A1* | 1/2010 | Coldiron et al. ............ 715/736 |
| 2010/0057935 A1 | 3/2010 | Kawai et al. |
| 2010/0115496 A1 | 5/2010 | Amichai |
| 2010/0198960 A1 | 8/2010 | Kirschnick et al. |
| 2010/0250732 A1 | 9/2010 | Bucknell |
| 2010/0251128 A1* | 9/2010 | Cordasco ............... 715/736 |
| 2010/0333072 A1 | 12/2010 | Dulip et al. |
| 2011/0066892 A1 | 3/2011 | Gardner et al. |
| 2011/0119370 A1 | 5/2011 | Huang et al. |
| 2011/0130205 A1* | 6/2011 | Cho et al. ............... 463/42 |
| 2011/0202517 A1 | 8/2011 | Reddy et al. |
| 2011/0282642 A1* | 11/2011 | Kruger et al. ............ 703/27 |
| 2012/0017165 A1 | 1/2012 | Gardner et al. |
| 2012/0017210 A1 | 1/2012 | Huggins et al. |
| 2012/0023429 A1 | 1/2012 | Medhi |
| 2012/0101799 A1 | 4/2012 | Fernandes |
| 2012/0166634 A1 | 6/2012 | Baumback et al. |
| 2012/0246310 A1 | 9/2012 | Broda et al. |
| 2012/0314616 A1 | 12/2012 | Hong et al. |
| 2013/0031449 A1 | 1/2013 | Griffiths et al. |
| 2013/0097307 A1 | 4/2013 | Vazac et al. |
| 2013/0116976 A1 | 5/2013 | Kanemasa et al. |
| 2014/0033055 A1 | 1/2014 | Gardner et al. |
| 2014/0189320 A1 | 7/2014 | Kuo |
| 2014/0280880 A1 | 9/2014 | Tellis et al. |
| 2015/0067527 A1 | 3/2015 | Gardner et al. |

OTHER PUBLICATIONS

Malan et al., "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

Dillenseger, "CLIF, a framework based on Fractal for flexible, distributed load testing" Nov. 18, 2008, Ann. Telecommun., 64:101-120.

* cited by examiner

REAL-TIME, MULTI-TIER LOAD TEST RESULTS AGGREGATION

TECHNICAL FIELD

The present disclosure relates generally to cloud computing; more particularly, to automated systems and methods for functional and/or load testing of websites or features of message-based, intranet, Internet, or browser-based applications.

BACKGROUND

Information technology is now routinely used by many enterprises to receive, process, and provide information via widely accessible electronic communications networks, such as the Internet. Yet most information technology systems will begin to deny service, or fail to process message traffic efficiently, when communications traffic exceeds a processing capacity of the system. Such failures in communication can significantly impair the operations of an enterprise in many ways. Slower website performance is also known to cause users/visitors to leave the website sooner. Another consequence of poor performance is that the website may be downgraded in search engine results rankings.

In recent years, enterprises and developers have sought an easy and affordable way to use cloud computing as a way to load and performance test their web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

Load testing a web-based application or website can involve simulating a very large number (e.g., up to or beyond 1,000,000) of virtual website users via Hypertext Transfer Protocol (HTTP) or HTTP Secure (HTTPS) message intercommunications with the target website. For very large tests, sending and aggregating the test results data generated from all of the load servers to a database available to a dashboard in real-time has been problematic. The huge overhead of receiving and processing a very large number of HTTP messages containing all of the requests and responses sent from each of the many load servers to the analytic servers responsible for analyzing the test results data can easily overwhelm the resources of the server. In addition, communications bottlenecks can occur wherein messages get queued up in long stacks or lines, such that the test results are no longer sent to the database in real-time, and therefore are not available in the dashboards in real-time. In extreme cases, the load test servers can also back up, causing them to not generate the appropriate load on the customers' websites or web applications.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
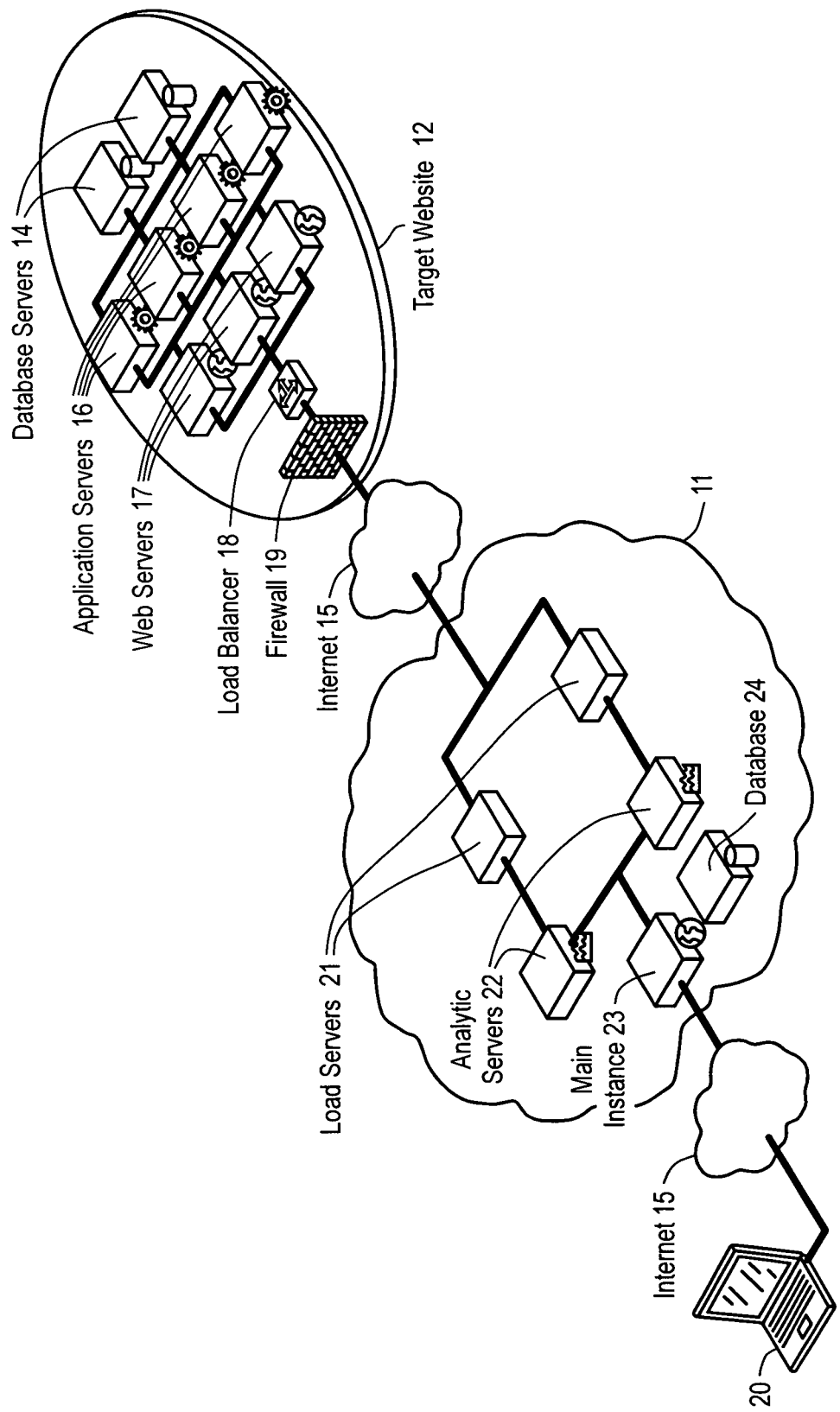
FIG. 1 illustrates an example high level architectural diagram of one stage of a CloudTest® provisioning process.

In the following description specific details are set forth, such as server types, cloud providers, structural features, process steps, etc., in order to provide a thorough understanding of the subject matter disclosed herein. However, persons having ordinary skill in the relevant arts will appreciate that these specific details may not be needed to practice the present invention. It should also be understood that the elements in the FIGS. are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that allows applications to be hosted and run at Microsoft datacenters.

A "private cloud" is a cloud that is not generally available to the public, and which is typically located behind a firewall of a business. Thus, a private cloud is only available as a platform for users of that business who are behind the firewall.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server; it can also refer to any software or dedicated hardware capable of providing computing services.

In the context of the present disclosure, "load" servers (also referred to as "Maestro" or "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, stream the results to real-time dashboards, and store them in a database.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e., within milliseconds or microseconds.

A "grid" or "test grid" refers to a collection of interconnected load servers and result servers that may be used to run a load test on a target website or web applications. As disclosed herein, a computer program or grid wizard may be utilized to automatically determine the global, cross-cloud, resources needed to execute a test by examining the test plan or script (also referred to as a test composition). Furthermore, the computer program can automatically allocate those server resources required for the test across multiple different cloud providers; verifies that the allocated servers are operational; and that the allocated servers are running proprietary load testing software or computer program product correctly. The computer program or product also monitors the allocated servers, replacing non-operational servers (when allocated, and during execution of the test) and displays results from multiple globally distributed clouds in a real-time streaming dashboard which requires no user initiated refresh.

In one embodiment, a method and system is provided for calculating load test aggregated test results at three architectural levels: first, at the load server level; second, at the analytics server level; and lastly at the system-wide datastore level. In a specific implementation, detailed level "raw" data (the content of a request sent to a website e.g., to access a homepage) is not sent from any of the load servers to any analytic server. Thus, system resources on the load server side are not wasted for the continual sending of raw data. Similarly, system resources on the analytics server side are conserved since the need to receive and process raw data sent from the load servers is obviated.

Instead of sending the raw data (web pages' responses and their statistics) obtained during a load test from each of the load servers to the analytic servers, a level of aggregation is added within each of the load servers. That is, in one embodiment, each load server includes an embedded component or client (referred to as a Results Service Client) that performs analytics server functions at the load server level. This Results Service Client aggregates test result data and generates various results statistics or metrics, e.g., average response time, average response size, etc., from the raw data that the load server received from the target website or application. The statistics computed by the Results Service Client in each of the load servers are then sent to their associated analytic server at periodic intervals (e.g., once every five seconds).

FIG. 1 illustrates an example high level architectural diagram of one stage of a CloudTest® provisioning process, which is the name given to the application program or grid wizard program described herein. As shown, a target website 12 includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15a. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a pair of load servers 21 within cloud 11, consistent with a snapshot view of the start of a process of deploying a test grid. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps (e.g., from code stored in a memory) that allocates the server resources required for the test across one or multiple different cloud providers. The same application that allocates/verifies server resources may also verify that the allocated servers are operational to conduct the website load test. The main instance may also execute code that implements the multi-tiered load test results aggregation steps disclosed herein.

Connected to the front-end of cloud 11 through Internet cloud 15 is a laptop computer 20 associated with a user who may orchestrate deployment of the test of target website 12. It is appreciated that in other implementations, computer 20 may comprise a desktop computer, workstation, or other computing device that provides a user interface that allows a user to create and execute the test composition, define the parameters of the grid, initiate the load test, as well as analyze/review results of the test in real-time. The user interface may be web-based so it can be accessed from any computer having web-browser capabilities from any location in the world, without installation of specialized software.

Persons of skill in the art will understand that the software which implements main instance 23 may also be downloaded to the user's laptop computer 20 or implemented on a separate hardware appliance unit located either at the user's premises (e.g., behind the firewall) or anywhere in clouds 15 or 11. It is further appreciated that laptop 20 is representative of a wide variety of computer devices, such as workstations, personal computers, distributed computer systems, etc., that may be utilized by the user to launch the method for provisioning/running the cross-CloudTest grid, analyzing streaming real-time results, as well as monitoring the performance of the actual load test.

Continuing with the example of FIG. 1, the application program running on main instance 23 operates to create a graphical user interface (GUI) that allows a user of laptop 20 to remotely interact with the application, view/monitor the test results in real-time, and modify parameters/test conditions dynamically during the actual test. (For purposes of the present disclosure, the grid wizard is considered synonymous with the application program or system program that performs the method and operations described herein.) In one embodiment, main instance 23 may include an embedded load server for running a relatively small load test that does not require the deployment of other load servers, and an embedded results (i.e., analytic) server for collecting/ aggregating the real-time test results. In another embodiment, the main instance and the database provide a basic CloudTest environment that can be used to launch/establish one or more grids, with more or more cloud providers being utilized to provision each grid.

The overall testing process begins with the user creating a sophisticated test plan or composition via a GUI of either the same application program running on main instance 23 or a GUI associated with another web browser application. The GUI may be utilized that generate complex parallel message streams for website testing. In one example, the test plan may be created in the form of a visual message composition (analogous to a music composition) for testing and demonstrating web services, such as that described in U.S. patent application Ser. No. 11/503,580, filed Aug. 14, 2006, which application is herein incorporated by reference.

The process of deploying the test grid for a large-scale test may start with the user of laptop 20 indicating to main instance 23 the number of virtual users wanted on each track of the test composition. For example, the user of the system may wish test the target website with a load equal to 1000 users on each track of a test composition. The user may indicate the number of virtual users through an input entered on a browser page of the GUI (as described below), or, alternatively, invoke a grid wizard that automatically makes an intelligent allocation of the proper amount of resources needed to conduct the test, based on examining the composition that this grid will be running. By way of example, the system may determine that a single load server should be allocated to accommodate every 1000 virtual users.

Similarly, the system (via a grid wizard) may determine a proper allocation of result servers needed to accommodate the number of load servers specified. In one embodiment, users can specify how many load servers and how many result servers they want in each cloud and region. Alternatively, users may employ the grid wizard to specify all parameters. That is, users can simply specify a defined test composition, and the grid wizard automatically analyzes the composition and determines how many servers they need in each cloud and region. It is appreciated that the determination of the number of load servers and result servers is typically made based on considerations that ensure each virtual user has a satisfactory amount of bandwidth, CPU & memory resources, etc., such that it correctly simulates or behaves as a real-world browser.

Once the test has been defined and the parameters set (e.g., number of servers, server locations, etc.) via the grid wizard, upon user input, the user main instance 23 starts the process of actually deploying and allocating the specified resources by interacting with an application programming interface (API) of one or more cloud providers. By way of example, a user may click on a "Deploy Instances" button provided in a page of the CloudTest program GUI; in response, the system software contacts all of the different cloud APIs it needs and starts to allocate the required servers.

For example, if 1000 servers are to be allocated in EC2 there may be 40 simultaneous requests issued, each request being for 25 servers. If another 200 servers need to be allocated in Microsoft Azure in two different geographically-located data centers, two simultaneous requests may be issued, each for 100 servers in each data center (due to the fact that Azure does not support allocating smaller groups into one single deployment). In other words, the user may simply click on an icon button of a GUI to initiate the deployment/allocation of resources (e.g., machine instances) needed to execute the test composition, with the requests necessary to achieve that allocation being issued/handled in an automated manner, i.e., without user intervention.

FIG. 1 show the beginning of this process, wherein a first pair of load servers 21 and analytic servers 22 (also referred to as result servers or results services) have already been allocated and deployed on the grid.

Figure 2:
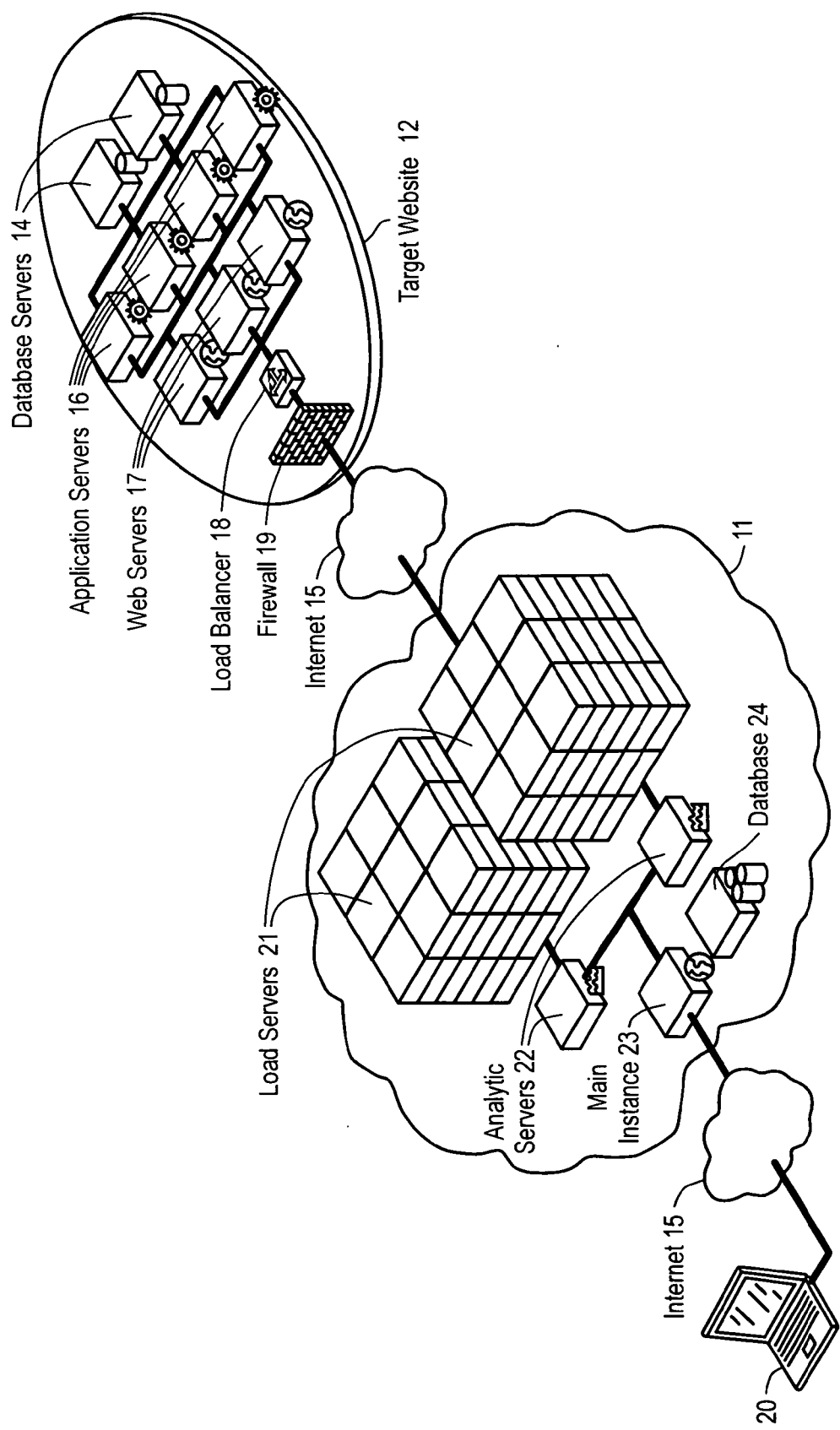
FIG. 2 illustrates an example high level architectural diagram of another stage of a CloudTest® provisioning process after the cross-cloud grid has been fully allocated and checked.

FIG. 2 illustrates an example high level architectural diagram of a later stage of a Cloudiest test grid provisioning process, which may be after the cross-cloud grid has been fully allocated and checked. For reasons of clarity, an array of just fifty-four interconnected load servers 21 are shown allocated per each result server 22 in the example of FIG. 2. It is appreciated, however, that the system and method described herein is highly scalable and capable of deploying/ allocating a massive amount of resources including hundreds or thousands of load servers as well as a corresponding portion or ratio of result servers, depending on the parameters specified by either the user or system prior to deployment of the grid. In one embodiment, a typical ratio of analytic (result) servers to load (maestro) servers is 1:50. As discussed previously, a grid—whether cross-cloud or single cloud—is a collection of load servers 21 and result servers 22, all of which (or a subset of) can be used to run a load test in concert.

Figure 3:
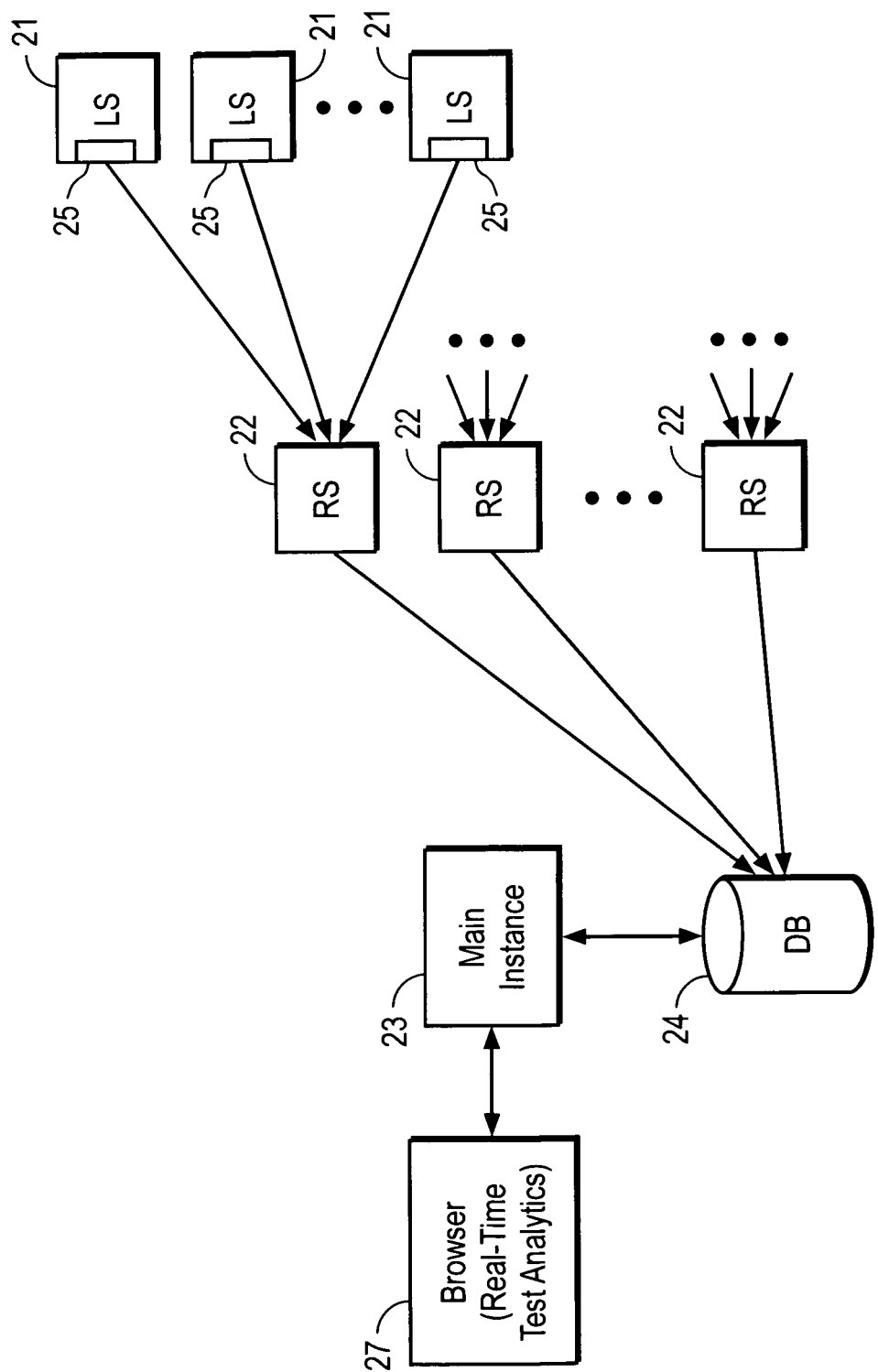
FIG. 3 is an example block high level architectural diagram that illustrates how, in real-time, load test results are aggregated at multiple different tiers or levels.

FIG. 3 is an example block high level architectural diagram that illustrates how, in real-time, load test results are aggregated at multiple different tiers or levels. As shown, block 27 represents a browser that provides real-time test analytics to a user (e.g., via laptop 20 shown in FIG. 1, or other computer device). Browser 27 is shown connected with main instance 23, which, in turn, is coupled with database 24. Database 24 provides system-level storage for aggregated test result data received from the Results Service servers 22. Database 24 receives aggregated test result data via a direct connection to each of the plurality of result servers 22.

Each of result servers 22 is connected to a plurality of associated load (Maestro) servers 21. Each load server 21 is shown having an embedded component or Result Service client 25, which computes metrics or statistics from the raw data (e.g., web pages) received from the target website or application. As discussed previously, the function of each load server 21 is to provide a load to the target website by creating one or more virtual users that access information on the target website. Within each Maestro server 21 is Result Service client 25 which functions to compute statistics such as average response time, average response size, and the like. In one embodiment, instead of sending all of the raw data received from the target website, Result Service client 25 computes relevant statistics and discards the data. Then, once an interval (e.g., every five seconds) the statistics computed by client 25 are sent to the associated result server 22.

Each of the result servers takes all of the statistics received from all of its associated load servers 21 and further aggregates those statistics. In other words, each result server 22 aggregates the aggregated results received from all of the load servers 21 that it is connected to. The resulting aggregated data is then further aggregated in database 24. Thus, statistics such as average response time across all of load servers 21 for the load test is stored in database 24 and available on a real-time basis to browser 27, via database queries performed by the main instance 23, which can perform further aggregation, grouping, filtering, etc.

Practitioners in the art will appreciate that the disclosed multi-tiered architecture does not overburden analytic servers 22 with excessive messaging of raw data. Furthermore, persons of skill will understand that aggregating statistical results data on multiple levels, beginning at the point closest to the actual load test results' creation, allows a user to view results in real-time on an analytic dashboard graphical user interface, thereby permitting real-time analysis across the entire testing infrastructure.

In a specific embodiment, each load server 21 includes an accumulator that stores the statistically aggregated data (e.g., average response time) computed on a second-by-second basis. Periodically (e.g., every 5 seconds), each load server 21 sends an appropriate number of messages (e.g., 5 messages, one for each second) to its associated result server 22. That is, one batched message is sent every 5 seconds—the batched message including data about all of the previous 5 seconds. Each message contains the data metrics computed every one second interval. These fine granularity metrics are then further aggregated in database 24. It is appreciated that by computing statistics/metrics on a second-by-second basis, the analytic dashboard running on browser 27 can analyze the results on various levels of granularity. In other words, the user may want to view statistical results of the load test on a minute-by-minute basis, or all the way down to a second-by-second basis. Thus, the architecture described herein allows a user to view real-time streaming results in an analytic dashboard of various performance metrics on a second-by-second basis, even when there are millions of virtual users on thousands of load servers.

Figure 4:
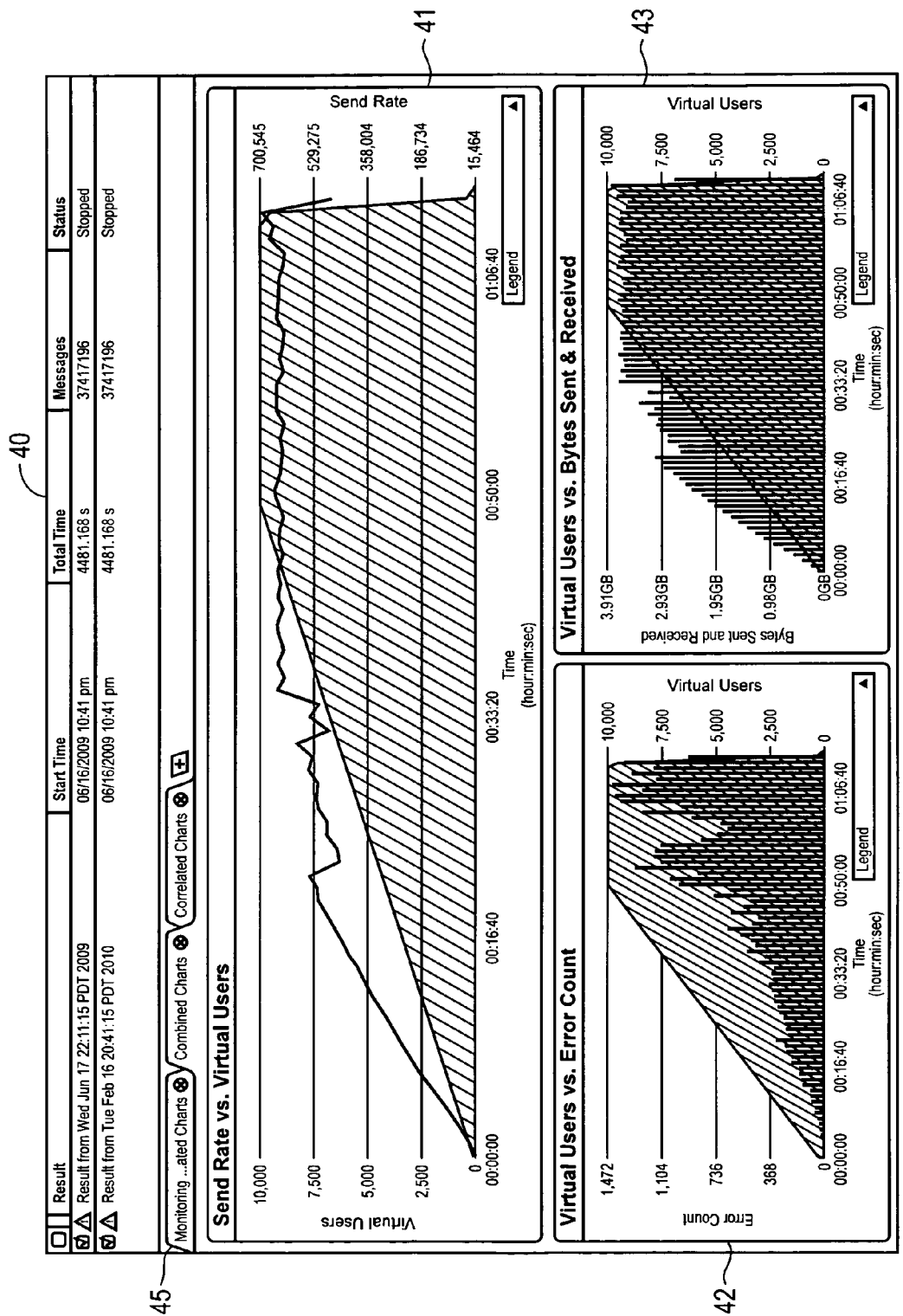
FIG. 4 illustrates an example graphical user interface window that shows real-time results of a test composition running on an example grid.

FIG. 4 illustrates an example graphical user interface window (also referred to as "widget") 40 that shows real-time results of a test composition running on an example grid. In other words, monitor summary widget 40 provides the user with visibility into the load that the test is creating on the grid server instances. (In the context of the present disclosure, a widget refers to a super class of charts—anything that a user might want to display graphically on a user interface. A widget can be a cross-set of results data, a set of charts, a list of data, or any combination/correlation of data displayed on the analytic dashboard.)

As can be seen, a set of combined charts are shown graphically in various window fields. For example, field 41 illustrates the number of virtual users (shaded area) and the send rate (heavy line) as a function of test time. Field 42 illustrates error count (vertical dark lines) and the number of virtual users (shaded area) versus test time. Field 43 shows the number of bytes sent and received (vertical dark lines) and the number of virtual users (shaded area) as a function of test time. It is appreciated that the user may select/view a wide variety of charts (combined, correlated, etc.) using tabs 45. Collectively, the charts provided in window 40 allow a user to view, analyze, and monitor test results and information in real-time so as to help identify root causes of performance problems their website or web application may be experiencing.

Persons of skill in the arts will appreciate that FIG. 4 shows how the entire test grid (comprising a huge number of interconnected load and result servers) works in concert to send load, receive responses, aggregate and analyze those responses into a real-time streaming graphical result displayed to the user. All this is accomplished regardless of how many server instances and different cloud providers are utilized to run the load test. Moreover, the various result charts may be viewed in one or many real-time streaming analytic dashboards. In each of the charts displayed on analytic dashboard window 40, the user may change the time format or legend of the horizontal axis for reporting the testing analytics in real-time on a varying time (e.g., hour-by-hour, minute-by-minute, or second-by-second) basis.

During the playback of the test composition and while the user is monitoring/viewing the test results displayed on GUI window 40, the user may pause or stop the test. Stopping the test closes the result and unloads the running test composition from all of the load servers. On the other hand, pausing or temporarily halting the test stops the load from all of the load servers, but keeps the test composition loaded and ready to resume playing into the same result. For instance, the user may pause the test after identifying a problem that requires adjustment of the load balancer on the target website. It should be understood that when the test is temporarily halted in this manner, the grid remains fully provisioned and running. In other words, the composition and running of the load test is independent from the provisioning and running of the grid. After any adjustments or reconfiguration of the target website, the user may continue with the execution or playback of the test composition, either beginning at the place where it was halted, or re-starting the test from the beginning. Persons of skill in the art will appreciate that the ability to start/re-start the test without affecting the state of the grid, in conjunction with the ability to view test results metrics in real-time (e.g., second-by-second) provides a powerful advantage over prior art methods for testing a customer website.

Figure 5:
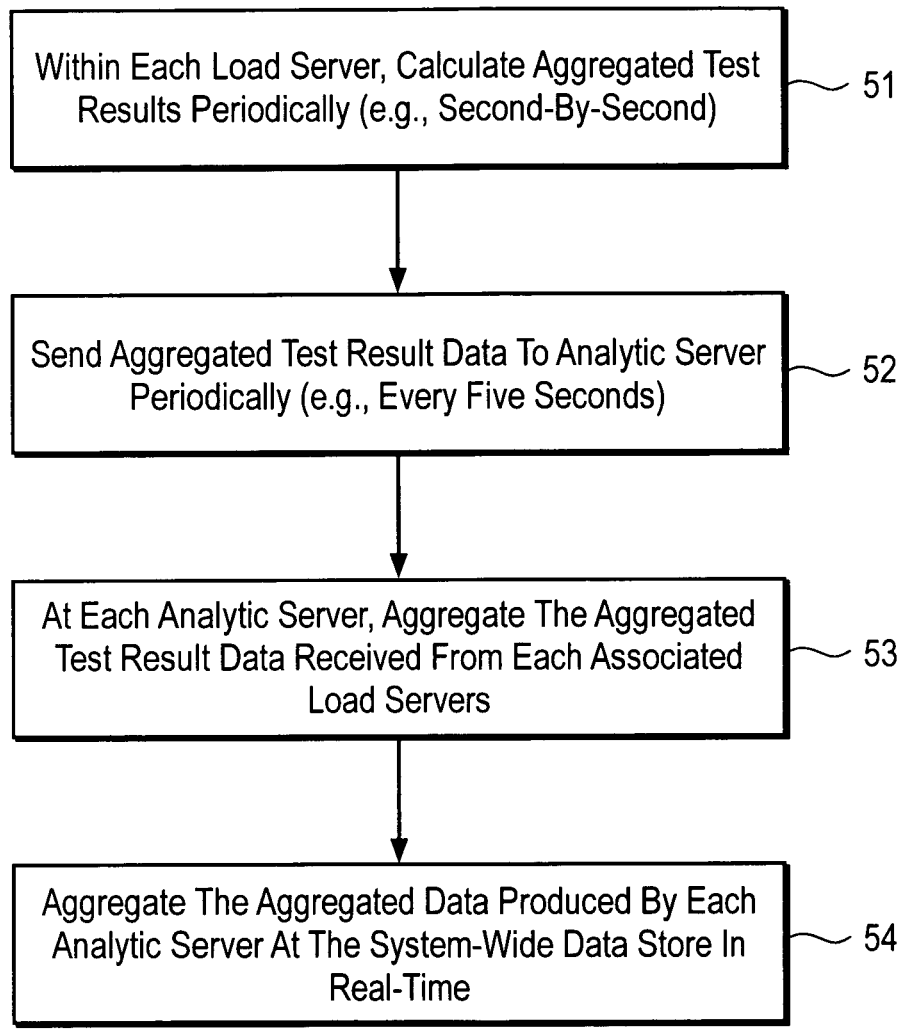
FIG. 5 is an example flow diagram of an automated sequence of steps for aggregating load test results at multiple different tiers or levels.

FIG. 5 is an example flow diagram of an automated sequence of steps for aggregating load test results at multiple different tiers or levels. The example method begins at a point where the load test grid is up and running, and the test composition is being executed on the target website. As the load test progresses, within each load server, a component or client periodically calculates or computes aggregated test results from the raw load test data generated from the target website (block 51). The raw data may comprise HTTP, Simple Object Access Protocol (SOAP) or other protocols messages' responses received from the target website, whereas the aggregated test results may comprise any statistic or metric of interest. The periodic interval that the aggregated test results are computed for may vary, but in a specific embodiment, results are computed every second.

The aggregated test results computed by the client running on each load server are periodically sent to their associated analytic server (block 52). The period at which the aggregated results are sent to the analytic servers may be equal to or greater than the period at which the aggregated test results are computed within each load server. In a typical implementation, aggregated test result data is computed by each load server every second, with the results of those computations being sent to the analytic servers from each of the load servers every five seconds.

Next, at each analytic server the aggregated test result data received from each of the associated load servers is further aggregated (block 53). In other words, each analytic server produces aggregated test result data across all of its associated load servers. For example, if each analytic server is associated (i.e., connected) with 50 load servers, each analytic server aggregates statistics/metrics across the aggregated test result data received from each of the 50 load servers.

Finally, at block 54, the aggregated statistical data produced by each analytic server is further aggregated at the system-wide data store in real-time. For instance, Structured Query Language (SQL) queries to the database can perform statistical functions (e.g., AVG, SUM, etc.) against tables' rows which have been inserted from the individual analytics servers, thereby producing further (third-level) aggregated results. As explained above, the results of this final level of aggregation is available in real-time to a browser executing an analytic dashboard that provides a graphical display of the results in various charts.

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for real-time analysis of results from a load test as the load test is being performed on a target website, comprising:
   (a) computing first-level aggregated test results within each of a plurality of load server instances that generate a load on the target website, the load including requests of a plurality of virtual users, the first-level aggregated test results including first-level response time statistics computed from data received by each of the plurality of load server instances from the target website in response to the generated load, the first-level aggregated test results including statistics computed by an embedded component within each of the plurality of load server instances every first time interval, the statistics including an average response time across a subset of the plurality of virtual users;
   (b) sending the first-level aggregated test results from each of the plurality of load server instances to an associated one of a plurality of analytic server instances every second time interval, the second time interval being longer than the first time interval;
   (c) computing second-level aggregated test results by each of the plurality of analytic server instances in response to receiving the first-level aggregated test results from the plurality of load server instances every second time interval, the second-level aggregated test results including second-level response time statistics computed from the first-level aggregated test results;
   (d) storing the second-level aggregated test results in a data storage instance;
   (e) running a query to the data storage instance to perform one or more statistical functions on the second-level aggregated test results, thereby producing third-level aggregated test results, the third-level aggregated test results including a website response time statistic across all of the virtual users; and
   (f) communicating the third-level aggregated test results to a browser application for providing an analytic dashboard with a graphical user interface that outputs the website response time statistic,
   wherein steps (a)-(f) are each performed in real-time as the load test is being performed on the target website.

2. The computer-implemented method of claim 1 wherein the plurality of load server instances and the plurality of analytic server instances are provided by at least one cloud provider.

3. The computer-implemented method of claim 1 wherein the first time interval is approximately one second.

4. The computer-implemented method of claim 1 wherein the second time interval is approximately five seconds.

5. The computer-implemented method of claim 1 further comprising changing, in real-time responsive to user input, a time format of a chart displayed on the analytic dashboard of the third-level aggregated test results.

6. The computer-implemented method of claim 1 wherein the periodically sending of the first-level aggregated test results comprises periodically sending a batch message to the associated one of the plurality of analytic server instances, the batch message comprising all of the first-level aggregated test results computed during the second time interval.

7. A non-transitory computer-readable storage medium encoded with a computer program product, which, when executed, is operable to:
   (a) compute first-level aggregated test results within each of a plurality of load server instances during execution of a load test that generates a load on a target website, the load including requests of a plurality of virtual users, the first-level aggregated test results including first-level response time statistics computed from data received by each of the plurality of load server instances from the target website in response to the generated load, the first-level aggregated test results including statistics computed by an embedded component within each of the plurality of load server instances every first time interval, the statistics including an average response time across a subset of the plurality of virtual users;
   (b) send the first-level aggregated test results from each of the plurality of load server instances to an associated one of a plurality of analytic server instances every second time interval, the second time interval being longer than the first time interval;
   (c) compute second-level aggregated test results by each of the plurality of analytic server Instances in response to receiving the first-level aggregated test results from the plurality of load server instances every second time interval, the second-level aggregated test results including second-level response time statistics computed from the first-level aggregated test results;
   (d) store the second-level aggregated test results in a data storage instance;

(e) run a query to the data storage instance to perform one or more statistical functions on the second-level aggregated test results, thereby producing third-level aggregated test results, the third-level aggregated test results including a website response time statistic across all of the virtual users; and (f) communicate the third-level aggregated test results to a browser application for providing an analytic dashboard with a graphical user interface that outputs the website response time statistic, wherein (a)-(f) are each performed in real-time during the running of the load test.

8. The non-transitory computer-readable storage medium of claim 7 wherein the computer program product, when executed, is further operable to periodically send one or more messages to the associated one of the plurality of analytic server instances, each message comprising the first-level aggregated test results computed in one of the first time intervals.

9. The non-transitory computer-readable storage medium of claim 7 wherein the computer program product, when executed, is further operable to store the website response time statistic in the data storage instance, the website response time statistic being available on a real-time basis to the browser application.

10. The non-transitory computer-readable storage medium of claim 7 wherein the plurality of load server instances and the plurality of analytic server instances are provided by more than one cloud provider.

11. The non-transitory computer-readable storage medium of claim 7 wherein the first time interval is approximately one second and the second time interval is approximately five seconds.

12. The non-transitory computer-readable storage medium of claim 7 wherein the computer program product, when executed, is further operable to change, in real-time responsive to user input, a time format of a chart displayed on the analytic dashboard of the third-level aggregated test results.

13. A computer-implemented method for real-time analysis of results from a load test as the load test is being performed on a target website, comprising:

computing first-level aggregated test results within each of a plurality of load server instances, each load server instance simulating a plurality of virtual users that generate a load on the target website, the first-level aggregated test results including statistics computed by an embedded component within each of the plurality of load server instances as the load test is being performed from data received by each of the plurality of load server instances from the target website in response to the generated load, the first-level aggregated test results being computed every N seconds, where N is a positive integer, the statistics including an average response time across a subset of the plurality of virtual users;

sending, as the load test is being performed, a batch message that includes all of the first-level aggregated test results computed by each of the plurality of load server instances to an associated one of a plurality of analytic server instances every M seconds, where M is an integer greater than N;

computing, as the load test is being performed, second-level aggregated test results by each of the plurality of analytic server instances in response to receiving the first-level aggregated test results from the plurality of load server instances every M seconds, the second-level aggregated test results including second-level response time statistics computed from the first-level aggregated test results;

storing, as the load test is being performed, the second-level aggregated test results in a data storage instance;

running, as the load test is being performed, a query to the data storage instance to perform one or more statistical functions on the second-level aggregated test results, thereby producing third-level aggregated test results, the third-level aggregated test results including a website response time statistic across all of the virtual users; and communicating, as the load test is being performed, the third-level aggregated test results to a browser application for providing an analytic dashboard with a graphical user interface that outputs the website response time statistic in real-time.

14. The computer-implemented method of claim 13 wherein the plurality of load server instances and the plurality of analytic server instances are provided by more than one cloud provider.

* * * * *